(12) United States Patent
Mo (10) Patent No.: US 8,826,402 B2
(45) Date of Patent: Sep. 2, 2014

(54) MANAGEMENT OF AN INSTANT MESSAGE SESSION

(75) Inventor: Jianxiang Mo, Hangzhou (CN)

(73) Assignee: Alibaba Group Holding Limited (KY)

( * ) Notice: Subject to any disclaimer, the term of this patent is extended or adjusted under 35 U.S.C. 154(b) by 507 days.

(21) Appl. No.: 12/804,133

(22) Filed: Jul. 13, 2010

(65) Prior Publication Data

US 2011/0016516 A1 Jan. 20, 2011

(30) Foreign Application Priority Data

Jul. 15, 2009 (CN) .......................... 2009 1 0152037

(51) Int. Cl.
*H04L 29/06* (2006.01)
*H04L 12/58* (2006.01)
*H04L 29/08* (2006.01)
*H04L 9/32* (2006.01)
*G06F 21/31* (2013.01)

(52) U.S. Cl.
CPC .............. *H04L 12/581* (2013.01); *H04L 67/14* (2013.01); *H04L 63/08* (2013.01); *H04L 51/04* (2013.01); *H04L 63/083* (2013.01); *H04L 9/32* (2013.01); *H04L 63/0861* (2013.01); *G06F 21/31* (2013.01)
USPC ............... 726/7; 709/207; 709/227; 709/206; 455/415

(58) Field of Classification Search
CPC ....... H04L 63/08; H04L 12/581; H04L 51/04; H04L 67/14; H04L 63/083; H04L 9/32; H04L 63/0861; G06F 21/31
USPC ........................................................... 726/7
See application file for complete search history.

(56) References Cited

U.S. PATENT DOCUMENTS

| | | | |
|---|---|---|---|
| 6,195,682 B1 | 2/2001 | Ho et al. | |
| 7,043,538 B2 | 5/2006 | Guedalia et al. | |
| 7,403,973 B2 | 7/2008 | Wilsher et al. | |
| 7,594,020 B2 * | 9/2009 | Apreutesei et al. | 709/227 |
| 7,689,697 B2 | 3/2010 | Chiba | |
| 2003/0051042 A1 | 3/2003 | Tazoe | |
| 2003/0154407 A1 | 8/2003 | Kato et al. | |
| 2005/0198379 A1 * | 9/2005 | Panasyuk et al. | 709/239 |
| 2005/0198397 A1 * | 9/2005 | Park | 709/248 |
| 2006/0058012 A1 | 3/2006 | Caspi et al. | |

(Continued)

FOREIGN PATENT DOCUMENTS

CN 101163113 A 4/2008

OTHER PUBLICATIONS

Chen, Mike Y., and Eric Brewer. "Active Connection Management in Internet Services." Computer Science Division, University of California, Berkeley, IEEE 2002.*

*Primary Examiner* — Thanhnga B Truong
*Assistant Examiner* — Narciso Victoria
(74) *Attorney, Agent, or Firm* — Van Pelt, Yi & James LLP (57) ABSTRACT

Maintaining an Instant Message (IM) session includes sending a login request to a first login server from a client; establishing the IM session and transferring Instant Messages between the client and the first login server; detecting an interruption in the transfer of the Instant Messages; obtaining an address of a second login server from a login allocation server; sending a reconnection request from the client to the second login server; and in the event that the reconnection request is accepted by the second login server, exchanging Instant Messages between the client and the second login server.

18 Claims, 7 Drawing Sheets

(56) References Cited

U.S. PATENT DOCUMENTS

| | | |
|---|---|---|
| 2006/0167849 A1 | 7/2006 | Marcus et al. |
| 2006/0167941 A1 | 7/2006 | Huang et al. |
| 2006/0271681 A1 | 11/2006 | Apreutesei et al. |
| 2007/0224978 A1 | 9/2007 | Wherry et al. |
| 2009/0055497 A1 | 2/2009 | Dickerson et al. |
| 2009/0138606 A1 | 5/2009 | Moran et al. |

* cited by examiner

MANAGEMENT OF AN INSTANT MESSAGE SESSION

CROSS REFERENCE TO OTHER APPLICATIONS

This application claims priority to People's Republic of China Patent Application No. 200910152037.5 entitled INSTANT MESSAGE METHOD, SYSTEM AND APPARATUS filed Jul. 15, 2009 which is incorporated herein by reference for all purposes.

FIELD OF THE INVENTION

The present application relates to the field of network communications and particularly to Instant Messaging (IM).

BACKGROUND OF THE INVENTION

An Instant Messaging (IM) system has a wide range of applications. The typical Instant Message system includes a client side and a server side. A user typically logs in a single login server that serves numerous clients. During the IM session, if the login server becomes unavailable (for example, hardware failure or shutdown due to maintenance), the sessions between the login server and its clients are lost and the users are redirected to the login interface and prompted to login again. The users connected to the login server experience service interruptions since they must repeat the login process and re-establish new IM sessions with a different login server. Further, when all the disconnected clients retry to log in to another login server simultaneously, excessive load pressure may be imposed on the login server.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
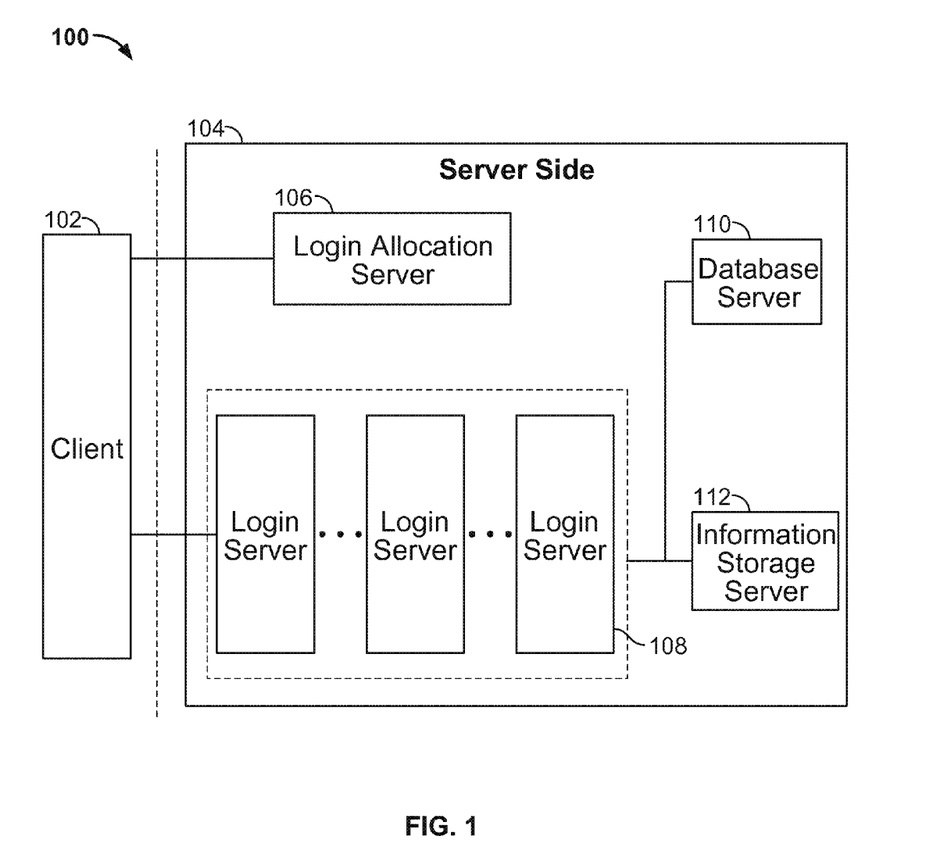
FIG. 1 is a block diagram illustrating an embodiment of an Instant Message system.

FIG. 1 is a block diagram illustrating an embodiment of an Instant Message system. System 100 includes a client side that has a client 102, and a server side 104 that includes a plurality of servers. Additional clients and servers are possible in other embodiments. The client device may be implemented using one or more computing devices such as a personal computer, a server computer, a handheld or portable device, a flat panel device, a multi-processor system, a microprocessor based system, a set-top box, a programmable consumer electronic device, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions. Each server device may be implemented similarly. Although separate servers with different server functions are shown in the example, some of the servers and their functions may be combined, while others may be further divided and distributed across multiple devices.

In the example shown, the servers include a login allocation server 106, a plurality of login servers 108, a database server 110, and an information storage server 112. An IM session is established between the client and one of the login servers. As will be explained in greater detail below, in the IM system shown, if the Instant Message communication session between the client and the login server is interrupted, the client can switch to and log in another login server automatically without loss of data between the client and the server side.

Figure 2:
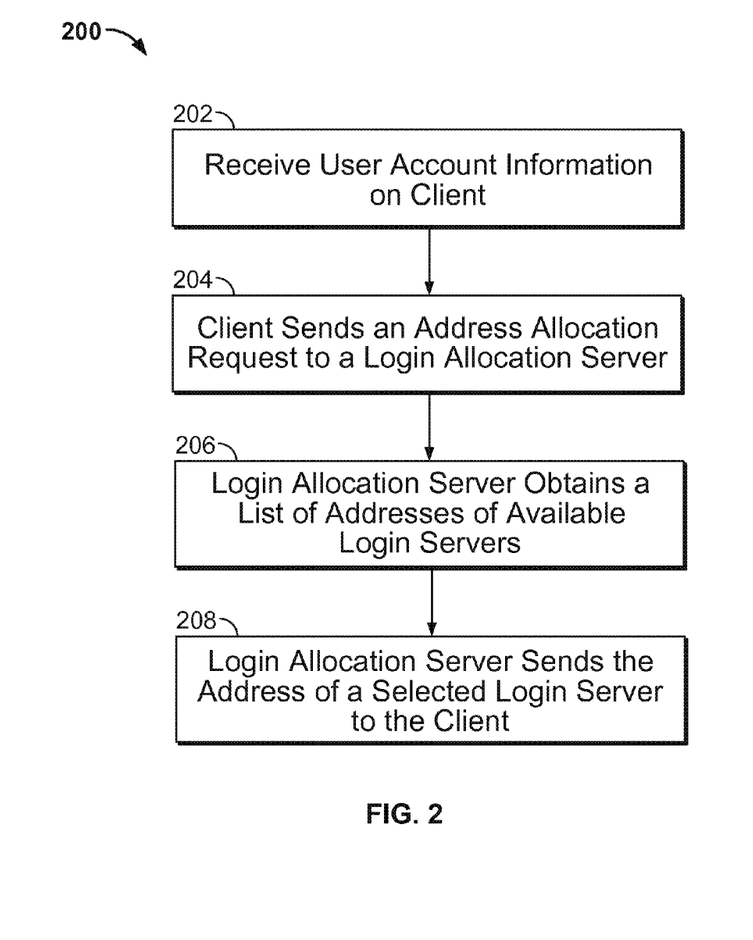
FIG. 2 is a flowchart illustrating an embodiment of a process for identifying a first login server.

FIG. 2 is a flowchart illustrating an embodiment of a process for identifying a first login server. At 202, user account information such as the user name and the password is entered by the user and received on the client. At 204, the client sends an address allocation request to a login allocation server. Once the login request is received by the login allocation server, at 206, the login allocation server obtains a list of addresses of available login servers. At 208, the login allocation server selects a login server from the list of available login servers and sends the address of the selected login server to the client.

Figure 3:
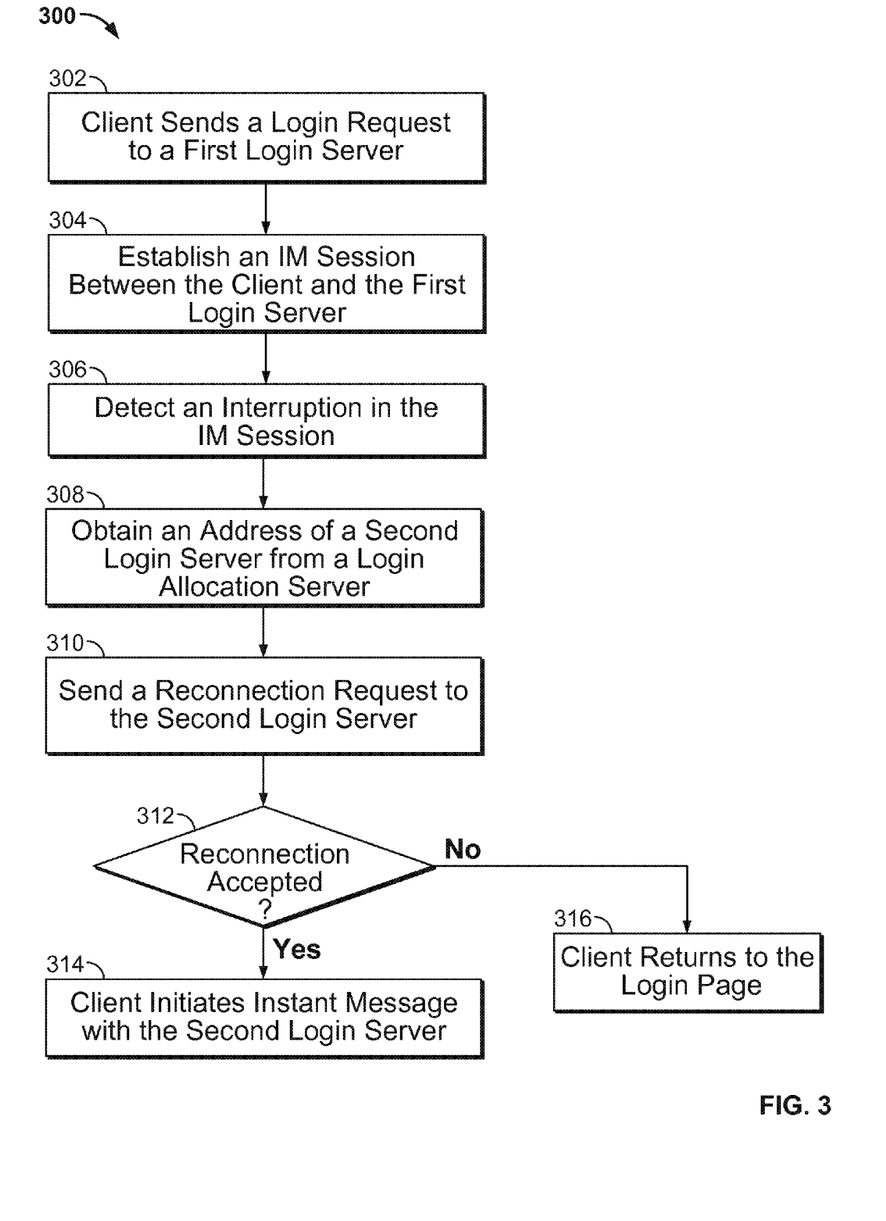
FIG. 3 is a flowchart illustrating an embodiment of a process for maintaining an IM session between a client and a server side.

FIG. 3 is a flowchart illustrating an embodiment of a process for maintaining an IM session between a client and a server side.

At 302, the client sends a login request to the first login server using the address of the first login server received from the login allocation server. The login request may include the client account information and a client side security key (Key-Client) which is unique, random information generated at the client. In some embodiments, the Key-Client includes a randomly generated alphanumerical string.

At 304, the login request is verified by the first login server and an IM session is established between the client and the first login server. Instant Messages are exchanged between the client and other peer clients via the first login server.

The first login server receives and verifies the login request. In some embodiments, if the login request passes the verification, the first login server generates a server side security key (Key-Server) according to the received Key-Client, returns verification passed information including the Key-Server to the client, stores a first set of property information of the client in the memory, and sends the first set of property information to the information storage server. The first set of property information includes the client account information and its corresponding Key-Server. In this example, Key-Server is random information generated by the first login server based on the received Key-Client and is used to uniquely identify a login state of the client. For example, a Key-Server may be a random alphanumerical string generated by applying the Key-Client to a function. A Key-Server is said to match a Key-Client if the former can be generated using the latter.

Once the IM session is established, the client stores the received Key-Server into its memory.

During the IM session, information related to the user such as user login and password is stored in the database server.

At 306, an interruption in the IM session is detected by the client. The interruption occurs when the first login server becomes unavailable or is otherwise unable to respond to the Instant Messages sent by the client.

After detecting an Instant Message disconnection with the first login server, at 308, the client stores the data to be sent to the first login server into a cache, and sends an address allocation request to the login allocation server. The login allocation server obtains a second list of addresses of servers available for login according to the address allocation request. After obtaining the second list of addresses, i.e. a list of addresses of some of the login servers available for login, the login allocation server selects a server in the list as the second login server and sends the address of the second login server to the client. To obtain the list of addresses of servers currently available for login, the login allocation server may send commands to all login servers periodically, determine a login server as available for login if a response is returned by the login server, and add the address of the login server to the list of addresses. Alternatively, the login allocation server can store the first list of addresses obtained during process 200, and select the second login server based on the stored list.

In this case, the login allocation server may select an address from the obtained list of addresses in a specified order, randomly, or according to a rule (such as the closest server to the client), as the address of the login server.

In some embodiments, the client optionally attempts to reconnect to the disconnected first login server after storing the data to be sent to the first login server into the cache. If the reconnection to the disconnected first login server fails, the client then obtains the second login server from the login allocation server.

At 310, the client sends to the second login server a reconnection request. The request includes a second set of property information of the client, such as the Key-Server returned by the first login server and client account information. In some embodiments, the client account information is encrypted and sent to the second login server.

At 312, it is determined whether the reconnection request is accepted. If so, at 314, the client resumes the IM session with the second login server. Else, at 316, the client is redirected to the login page, where the user is asked to re-login so that a new IM session can be established with a selected login server. In some embodiments, instead of redirecting the client to the login page, a third login server is obtained from the login allocation server and steps 308-312 are repeated.

Figure 4:
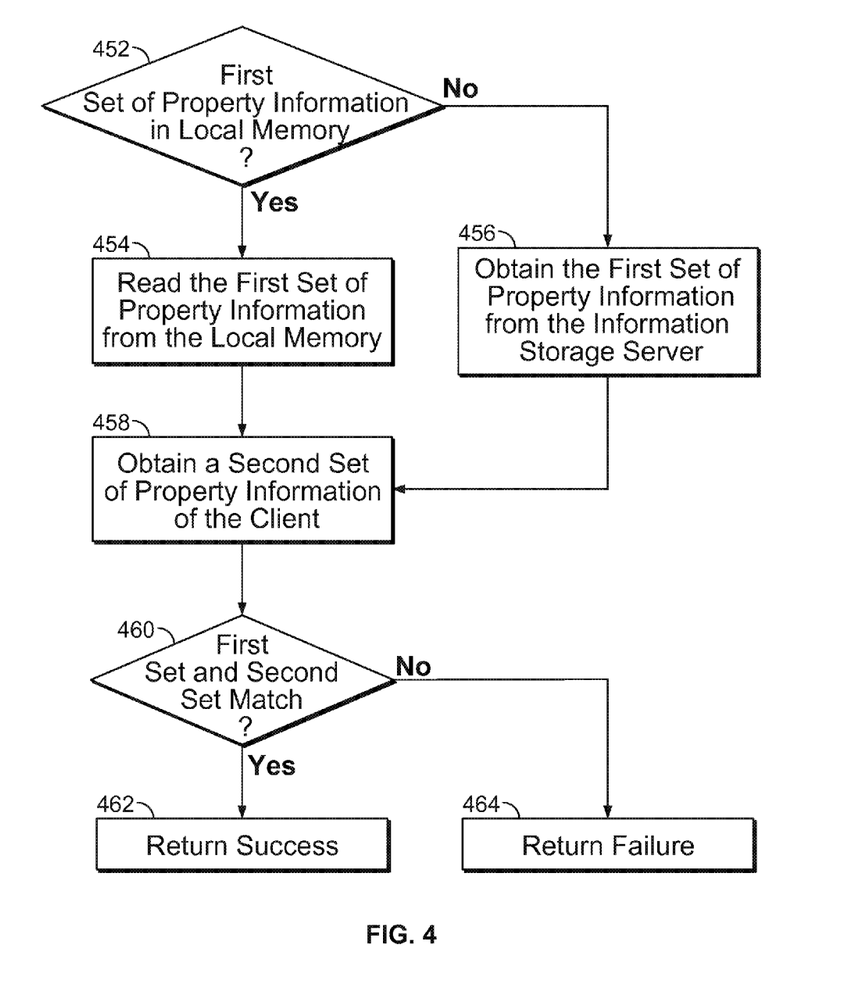
FIG. 4 is a flowchart illustrating an embodiment of a process for verifying reconnection request on the second login server.

FIG. 4 is a flowchart illustrating an embodiment of a process for verifying reconnection request on the second login server.

After receiving the reconnection request from the client, at 452, the second login server checks whether the first set of property information of the client is stored in local memory (such as a local file system, a local database, or the like) directly accessible by the second login server. If the first set of property information is stored in local memory, at 454, the second login server reads the first set of property information of the client from the local memory; otherwise, at 456, the second login server obtains the first set of property information of the client from the information storage server.

Here, if the second login server and the first login server are consistent (i.e., they have access to the same information), it is possible to search the local memory for the first set of property information of the client; thus, the second login server can obtain directly the first set of property information of the client from the local memory. If the second login server and the first login server are inconsistent, the first set of property information of the client is not stored in the local memory of the second login server; thus, the second login server obtains the first set of property information of the client from the information storage server.

The second login server verifies the received reconnection request based on the first set of property information. In this example, at 458, the second login server parses the received reconnection request to obtain the second set of property information of the client that is included in the reconnection request. At 460, the second login server compares the previously obtained first set of property information with the second set of property information. If the first and second sets of property information match, the reconnection request is verified and a success indicator along with the Key-Server is sent to the client at 462. If, however the first and second sets of property information do not match, a failure indicator is sent to the client at 464.

As described above, in the embodiment of the present application, when the login server is unavailable for services due to some reason such as a hardware failure or manual maintenance, the client losses the session with the login server. However, instead of returning to the login interface directly, the client initiates the reconnection to automatically switch the login server, without the loss of data between the client and the server side, and the login server will not be imposed by excessive pressure due to the simultaneous re-login by numerous clients.

Figure 5:
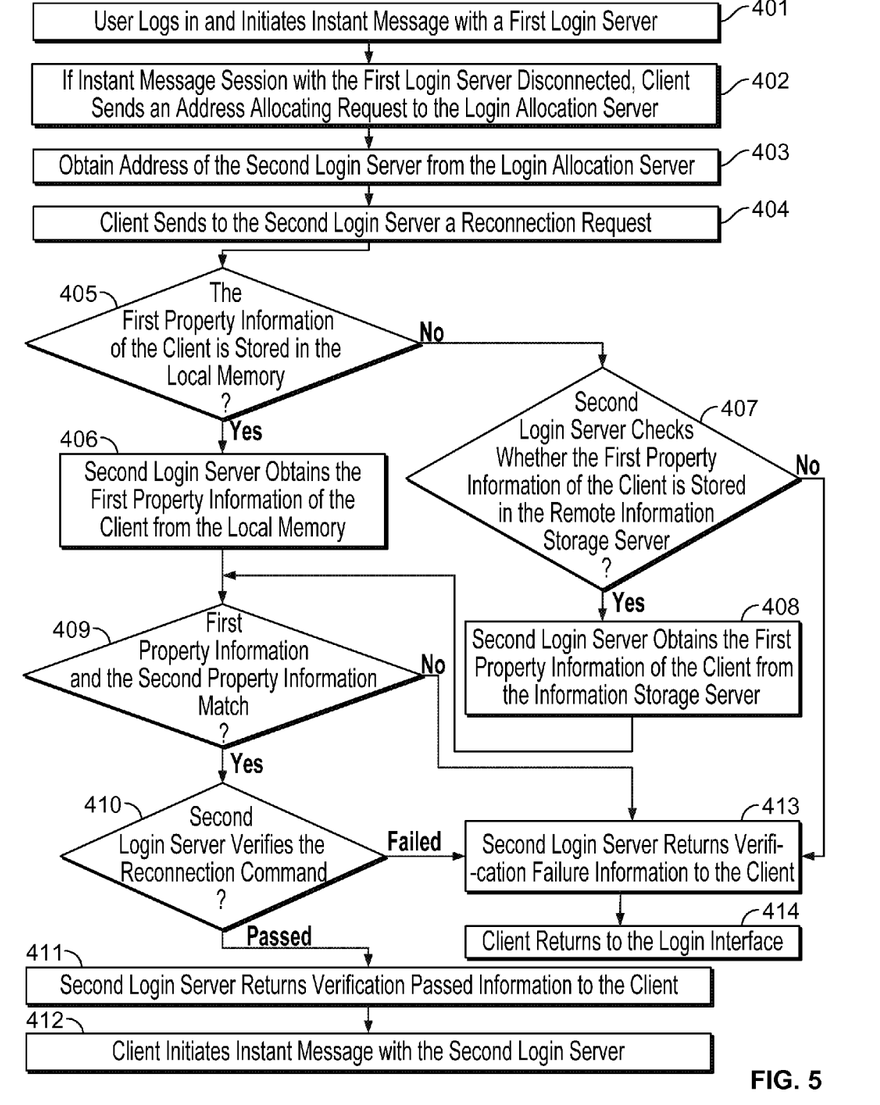
FIG. 5 is a flowchart illustrating another embodiment of a process for maintaining an IM session.

FIG. 5 is a flowchart illustrating another embodiment of a process for maintaining an IM session.

At 401, a user logs in via the client, which initiates an Instant Message session with a first login server. When the client logs in the first login server, the first set of property information of the client is stored by the first login server into its local memory and also by the remote information storage server. Here, the first set of property information includes user account information and the corresponding Key-Server. During the Instant Message session, the Instant Message information related to the user is stored in the database server in the background.

At 402, if the Instant Message session with the first login server is disconnected, the client stores the data to be sent to the first login server into a cache and sends an address allocation request to the login allocation server.

At 403, the login allocation server obtains a second list of addresses of servers available for login, determines one of the obtained second list addresses as the address of the second login server, and sends the address of the second login server to the client.

At 404, using the obtained address, the client sends to the second login server a reconnection request that includes a second set of property information of the client, including the Key-Server returned by the first login server and the client account information, which are encrypted and sent to the second login server by the client.

At 405, the second login server checks whether the first set of property information of the client is stored in the local memory. If the first set of property information is stored in its local memory, control is transferred to 406; otherwise, control is transferred to 407.

At 406, the second login server obtains the first set of property information of the client from the local memory and proceeds to 409.

At 407, the second login server accesses the remote information storage server and checks whether the first set of property information of the client is stored in the remote information storage server; if so, control is transferred to 408; otherwise, control is transferred to 413.

At 408, the second login server obtains the first set of property information of the client from the information storage server and control is transferred to 409.

At 409, the second login server parses the received reconnection request and compares the obtained first set of property information of the client with the second set of property information of the client in the reconnection request. If the first and second sets of property information match, control is transferred to 410; otherwise, control is transferred to 413. In some embodiments, a match is found if both sets of property information include the same account information and the Key-Server included in the second set of property information can be generated using the Key-Client included in the first set of property information.

At 410, the second login server verifies the received reconnection request, and if the verification is passed, control is transferred to 411; otherwise, control is transferred to 413.

At 411, the second login server obtains the Instant Message information related to the user from the database server and returns verification passed information, which also includes the Key-Server, to the client.

If the second login server obtains the first set of property information of the client from the information storage server, the second login server stores the obtained first set of property information of the client into its local memory.

At 412, the client initiates an Instant Message session with the second login server according to the received verification passed information.

If the verification passed information is received, that is, if the reconnection is successful, the client sends the data in the cache to the second login server to continue the Instant Message session. During the Instant Message session, new Instant Message information related to the user is still stored into the database server at the background.

At 413, the second login server returns verification failure information to the client.

At 414, after receiving the verification failure information, the client returns to the login interface. That is, the reconnection has failed and the user needs to re-login manually to start a new session.

Figure 6:
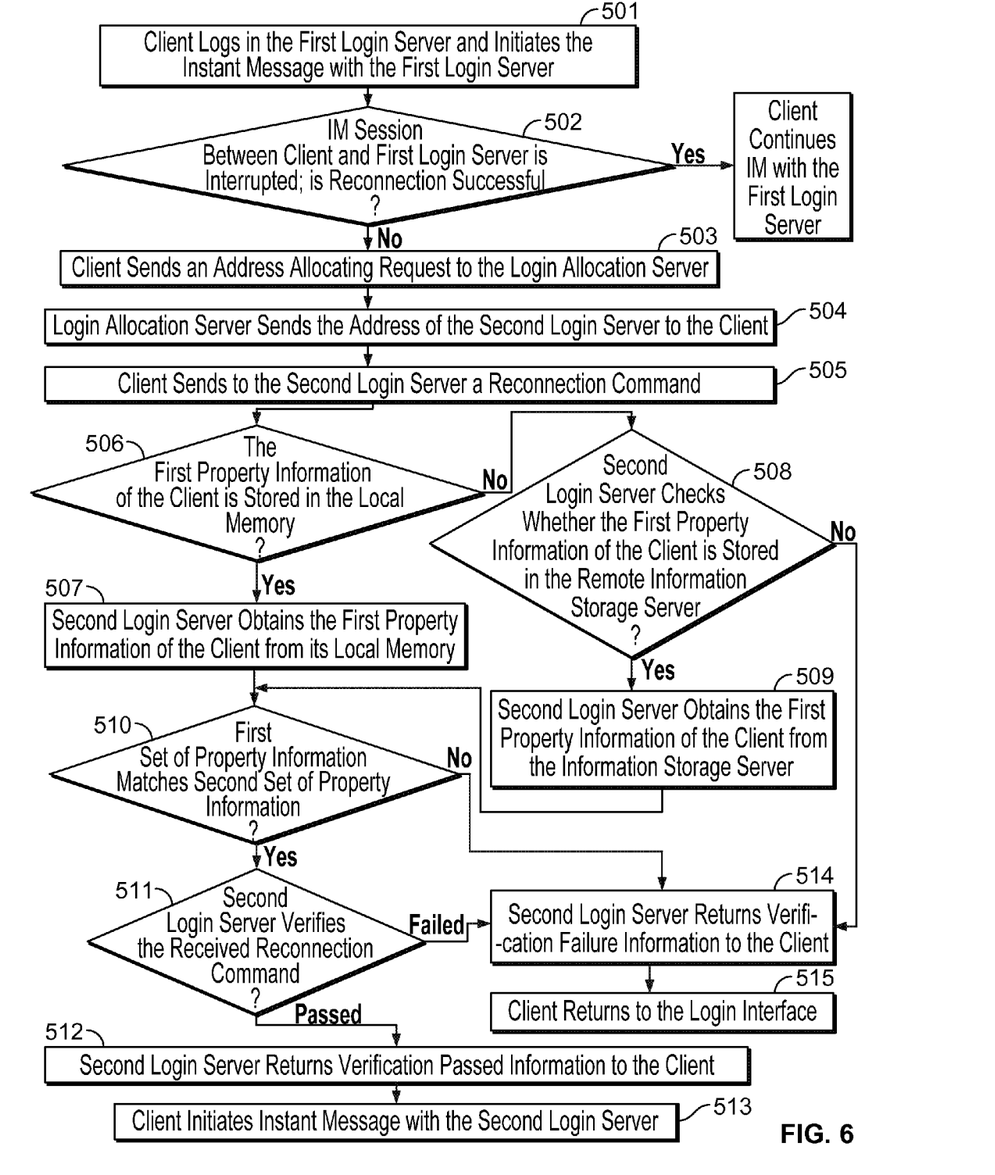
FIG. 6 is a flowchart illustrating another embodiment of a process for maintaining an IM session.

FIG. 6 is a flowchart illustrating another embodiment of a process for maintaining an IM session.

At 501, the client logs in the first login server and initiates an Instant Message session with the first login server. When the client logs in the first login server, the first set of property information of the client is stored by the first login server into its local memory and also by the remote information storage server. Here, the first set of property information may include the client account information and the corresponding Key-Server. During the Instant Message, the Instant Message information related to the user is stored in the database server at the background.

At 502, if the Instant Message with the first login server is disconnected, the client stores the data to be sent to the first login server into a cache, and tries to reconnect to the first login server. If the reconnection to the first login server is successful, the client continues the Instant Message session with the first login server; otherwise, 503 is executed.

At 503, the client sends an address allocation request to the login allocation server.

At 504, after receiving the address allocation request, the login allocation server obtains a second list of addresses of servers available for login, determines one of the obtained second list addresses as the address of the second login server, and sends the address of the second login server to the client. Here, the attempt of reconnecting with the first login server has failed, and the address of the second login server is different from that of the first login server.

At 505, according to the determined address, the client sends to the second login server a reconnection request carrying second set of property information of the client, including the Key-Server returned by the first login server and the client account information, which are encrypted and sent to the second login server by the client.

At 506, the second login server checks whether the first set of property information of the client is stored in the local memory. If the first set of property information is stored in its local memory, 507 is executed; otherwise, 508 is executed.

In this example, the reconnection of the client with the first login server has failed; thus, the second login server is unable to search its local memory for the first set of property information of the client and 508 is executed.

At 507, the second login server obtains the first set of property information of the client from its local memory and 510 is executed.

At 508, the second login server accesses the remote information storage server and checks whether the first set of property information of the client is stored in the remote information storage server. If so, 509 is executed; otherwise, 514 is executed.

At 509, the second login server obtains the first set of property information of the client from the information storage server and 510 is executed.

At 510, the second login server parses the received reconnection request and compares the obtained first set of property information of the client with the second set of property information of the client carried in the reconnection request; if the first and second set of property information are consistent, 511 is executed; otherwise, 514 is executed.

At 511, the second login server verifies the received reconnection request. If the verification is successful, 512 is executed; otherwise, 514 is executed.

At 512, the second login server obtains the Instant Message information related to the user from the database server at the background and returns verification success information, which may also include the Key-Server, to the client.

In the present embodiment, the second login server obtains the first set of property information of the client from the information storage server; thus, the second login server stores the obtained first set of property information of the client into its local memory.

At 513, the client initiates the Instant Message session with the second login server according to the received verification success information.

If the verification success information is received, that is, the reconnection is successful, then the client sends the data in the cache to the second login server for the continued Instant Message session. During the Instant Message session, new Instant Message information related to the user is still stored into the database server.

At 514, the second login server returns verification failure information to the client.

At 515, after receiving the verification failure information, the client returns to the login interface. That is, the reconnection failed and the user needs to re-login manually to start the reconnection.

In the embodiments above, the client sends an address allocation request to the login allocation server after the Instant Message session between the client and the first login server is interrupted, the login allocation server obtains the second list of addresses of the servers available for login after receiving the address allocation request, and selects one of the second list of addresses as the address of the second login server. In an embodiment of the application, the client can also determine another address from the obtained first list of addresses as the address of the second login server.

Figure 7:
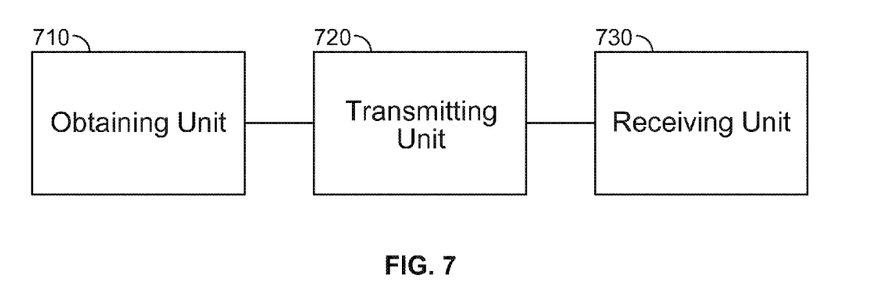
FIG. 7 is a block diagram illustrating an embodiment of a client.

FIG. 7 is a block diagram illustrating an embodiment of a client. In this example, the client includes an obtaining unit 710, a transmitting unit 720 and a receiving unit 730.

The obtaining unit 710 is configured to obtain an address of a second login server when the Instant Message session with the first login server is interrupted. In some embodiments, the obtaining unit obtains the address of the second login server that is determined by the login allocation server from the first list of addresses. Alternatively, the obtaining unit can obtain the address of the second login server from the second list of addresses of servers available for login. The obtaining unit is further configured to obtain the address of the first login server that is determined by the login allocation server from the first list of addresses of servers available for login.

The transmitting unit 720 is configured to send a reconnection request to the second login server according to the address of the second login server. The transmitting unit is further configured to send a login request including the client account information and the client key to the first login server according to the address of the first login server.

The receiving unit 730 is configured to receive a verification response returned by the second login server after the verification of the reconnection request. The receiving unit is further configured to receive a verification response returned by the first login server after the verification of the login request.

Figure 8:
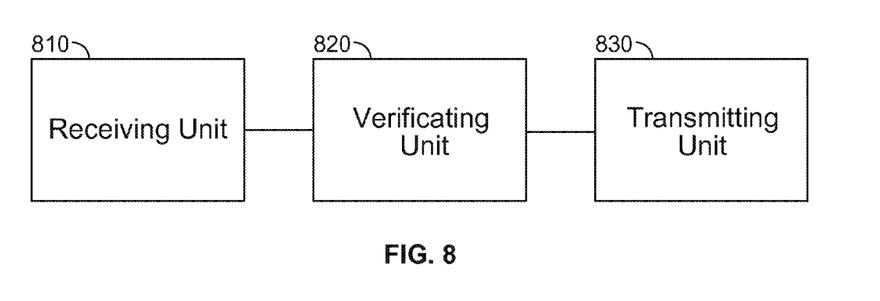
FIG. 8 is a block diagram illustrating an embodiment of a login server.

FIG. 8 is a block diagram illustrating an embodiment of a login server. In the example shown, the login server includes a receiving unit 810, a verifying unit 820, and a transmitting unit 830.

The receiving unit 810 is configured to receive a reconnection request sent by a client. The request includes the client account information and the client key from the client.

The verifying unit 820 is configured to verify the login request. The verifying unit 820 is configured to verify the received reconnection request. In some embodiments, the verifying unit further includes an obtaining sub-unit, a parsing sub-unit and a comparing and verifying sub-unit, where the obtaining sub-unit is configured to obtain the first set of property information of the client, the parsing sub-unit is configured to parse the reconnection request to obtain the second set of property information of the client, and the comparing and verifying sub-unit is configured to compare the first and second set of property information and verify the reconnection request if the first and second set of property information match.

The obtaining sub-unit first checks whether the first set of property information of the client is stored in the local memory and obtains the first set of property information of the client from the local memory if it is stored in the local memory; otherwise, the obtaining sub-unit obtains the first set of property information of the client from the information storage server.

The transmitting unit 830 is configured to send a verification response message to the client. The transmitting unit 830 is further configured to, if the verification is passed, store the first set of property information of the client into the local memory, send the first set of property information to the information storage server, and send a verification passed message including the server key to the client. Here, the first set of property information may include the client account information and the server key generated according to the client key.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

The application has been described with reference to the flowchart and/or block diagram of the method, device (system) or computer program product. It will be appreciated that each of the processes and/or blocks in the flowchart and/or block diagram, and the combination thereof, may be implemented by computer program instructions. The computer program instructions may be provided for a general purpose computer, a dedicated computer, an embedded processor or a processor of any other programmable data processing device to generate a machine, so that the instructions executed by the processor of a computer or any other programmable data processing device can generate means for implementing a function designated by one or more processes of the flowchart and/or one or more blocks of a block diagram.

These computer program instructions may also be stored in any computer readable storage which can guide the computer or other programmable data processing device to operate in a particular manner, so that the instructions stored in the computer readable storage can generate a product including instruction means, which implements a function designated by one or more processes of the flowchart and/or one or more blocks of a block diagram.

These computer instructions may be loaded to the computer or any other programmable data processing device, to enable the computer or any other programmable data processing device to execute a serial of operation steps to generate processing implemented by the computer, so that the instructions implemented in the computer or other programmable device can provide steps for implementing a function designated by one or more processes of the flowchart and/or one or more blocks of a block diagram.

It will be apparent to those skilled in the art that various modifications and alterations may be made to the invention without departing from the spirit and scope thereof. Thus, if all these modifications and alterations fall in the scope of the application defined in the claims and its equivalent technology, the invention is also intended to include these modifications and alterations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of maintaining an Instant Message (IM) session, comprising:
   receiving at a first login server a login request associated with a client, wherein the login request includes client account information and a client security key, wherein the client security key is generated at the client;
   establishing the IM session and transferring Instant Messages between the client and the first login server, wherein establishing the IM session includes:
      verifying, by the first login server, the login request; and
      if the verification is successful, storing, by the first login server, a first set of property information of the client into a local memory, and sending to a remote information storage server the first set of property information comprising the client account information and a server key generated according to the client security key, wherein the server key is to be used to identify a login state associated with the client; and
      sending, by the first login server, an indicator indicating that verification is successful to the client, the indicator comprising the server key to the client;
   receiving an indication associated with an interruption in the transfer of the Instant Messages at a login allocation server;
   sending an address of a second login server from the login allocation server to the client;
   receiving at the second login server a reconnection request from the client; and
   in the event that the reconnection request is accepted by the second login server, exchanging Instant Messages between the client and the second login server.

2. The method of claim 1, wherein the first login server is determined by:
   obtaining a first list of addresses of available login servers by the login allocation server; and
   selecting an address of the first login server from the first list of addresses.

3. The method of claim 2, wherein sending the address of the second login server comprises:
   obtaining a second list of addresses of available login servers at the login allocation server; and
   selecting an address of the second login server from the second list of addresses.

4. The method of claim 2, wherein sending the address of the second login server comprises determining the address of the second login server from the obtained first list of addresses.

5. The method of claim 1, wherein the reconnection request includes a second set of property information of the client, and the second set of property information includes the client account information and the server key.

6. The method of claim 1, wherein the second login server verifies the reconnection request by:
   obtaining the first set of property information of the client;
   parsing the reconnection request to obtain a second set of property information of the client;
   comparing the first set and the second set of property information; and
   accepting the reconnection request if the second and first set of property information match.

7. The method of claim 6, wherein the second login server obtains the first set of property information of the client by:
   checking, by the second login server, whether the first set of property information of the client is stored in the local memory; and
   if the first set of property information is stored in the local memory, obtaining the first set of property information of the client from the local memory;
   if the first set of property information is not stored in the local memory, obtaining the first set of property information of the client from the remote information storage server.

8. An Instant Message (IM) client system, comprising:
   one or more processors configured to:
      receive at a first login server a login request associated with a client, wherein the login request includes client account information and a client security key, wherein the client security key is generated at the client;
      establish the IM session and transfer Instant Messages between the client system and the first login server, wherein establishing the IM session includes:
         verifying, by the first login server, the login request; and
         if the verification is successful, storing, by the first login server, a first set of property information of the client into a local memory, and sending to a remote information storage server the first set of property information comprising the client account information and a server key generated according to the client security key, wherein the server key is to be used to identify a login state associated with the client; and
         sending, by the first login server, an indicator indicating that verification is successful to the client, the indicator comprising the server key to the client;
      receive an indication associated with an interruption in the transfer of the Instant Messages at a login allocation server;
      send an address of a second login server from the login allocation server to the client;
      receive at the second login server a reconnection request from the client system; and in the event that the reconnection request is accepted by the second login server, exchange Instant Messages between the client and the second login server; and one or more memories coupled to the one or more processors, configured to provide the one or more processors with instructions.

9. The system of claim 8, wherein the first login server is determined by:

obtaining a first list of addresses of available login servers by the login allocation server; and selecting an address of the first login server from the first list of addresses.

10. The system of claim 9, wherein sending the address of the second login server comprises:

obtaining a second list of addresses of available login servers at the login allocation server; and selecting an address of the second login server from the second list of addresses.

11. The system of claim 9, wherein sending the address of the second login server comprises determining the address of the second login server from the obtained first list of addresses.

12. The system of claim 8, wherein the reconnection request includes a second set of property information of the client, and the second set of property information includes the client account information and the server key.

13. A method of handling an Instant Message (IM) reconnection request, comprising:

receiving a reconnection request for an IM session from a client;

obtaining a first set of property information of the client, the first set of property information includes client account information and a first server key used in the IM session, wherein the first set of property information is obtained from either a local memory or a remote information storage server, wherein the first server key was generated according to a client security key, wherein the client security key was generated at the client, wherein the first server key is to be used to identify a login state associated with the client;

parsing the reconnection request to obtain a second set of property information of the client, the second set of property information includes client account information and a second server key used in the IM session;

comparing the second and first set of property information; and sending an indication of successful verification to the client if the first set and the second set of property information match.

14. The method of claim 13, wherein obtaining the first set of property information of the client comprises:

determining whether the first set of property information of the client is stored in the local memory; and if the first set of property information is stored in the local memory, obtaining the first set of property information of the client from the local memory;

if the first set of property information is not stored in the local memory, obtaining the first set of property information of the client from the information storage server.

15. The method of claim 14, if the first set of property information not is stored in the local memory, the method further comprises storing the obtained first set of property information of the client into the local memory.

16. An Instant Message server system comprising:

one or more processors configured to:

receive a reconnection request for an IM session from a client;

obtain a first set of property information of the client, the first set of property information includes client account information and a first server key used in the IM session, wherein the first set of property information is obtained from either a local memory or a remote information storage server, wherein the first server key was generated according to a client security key, wherein the client security key was generated at the client, wherein the first server key is to be used to identify a login state associated with the client;

parse the reconnection request to obtain a second set of property information of the client, the second set of property information includes client account information and a second server key used in the IM session;

compare the second and first set of property information; and send an indication of successful verification to the client if the first set and the second set of property information match; and one or more memories coupled to the one or more processors, configured to provide the processors with instructions.

17. The system of claim 16, wherein obtaining the first set of property information of the client comprises:

determining whether the first set of property information of the client is stored in the local memory; and if the first set of property information is stored in the local memory, obtaining the first set of property information of the client from the local memory;

if the first set of property information is not stored in the local memory, obtaining the first set of property information of the client from the information storage server.

18. The system of claim 17, if the first set of property information not is stored in the local memory, the method further comprises storing the obtained first set of property information of the client into the local memory.

* * * * *